United States Patent [19]

Kurelek

[11] 4,446,897

[45] May 8, 1984

[54] IMPROVEMENTS IN DISC FELLING HEADS

[75] Inventor: John Kurelek, Brantford, Canada

[73] Assignee: Koehring Canada Limited, Brantford, Canada

[21] Appl. No.: 343,300

[22] Filed: Jan. 27, 1982

[30] Foreign Application Priority Data

Aug. 5, 1981 [CA] Canada .................................... 383217

[51] Int. Cl.³ ............................................ A01G 23/08
[52] U.S. Cl. .................................... 144/34 R; 83/640; 83/928; 56/295; 144/336
[58] Field of Search .................... 83/928, 640; 56/295, 56/255, 256; 144/3 D, 34 R, 34 E, 33 S, 336

[56] References Cited

U.S. PATENT DOCUMENTS

3,343,575  9/1967  Trout ................................ 144/34 R
3,818,957  6/1974  Schoonover ...................... 144/34 R Primary Examiner—W. D. Bray
Attorney, Agent, or Firm—Sim & McBurney

[57] ABSTRACT

There is provided a method and apparatus for felling a tree. A tree is cut through with a circular saw, and then substantially immediately after the cutting, the tree is clasped by a grapple means. The apparatus for cutting the tree may include an offset exposed arc of the circular saw, and by mounting the apparatus on a swingable boom, it is possible to cut the tree in a scything or scythe-swinging action.

8 Claims, 4 Drawing Figures

IMPROVEMENTS IN DISC FELLING HEADS

This invention relates generally to the tree-harvesting industry, and has particularly to do with the design of a boom-mounted felling head for a tree harvestor, capable of permitting harvesting rates at relatively low vehicle speeds.

BACKGROUND OF THIS INVENTION

In my copending Canadian application No. 383,217 filed on Aug. 5, 1981, which corresponds to my U.S. application Ser. No. 343,359, filed concurrently herewith there is disclosed a boom-mounted felling head which incorporates a horizontally oriented circular saw blade in the lower portion, and tree grappling means in the upper portion, in a construction which is such as to allow the saw blade to cut through the trunk of a tree before the tree grappling means is activated to clasp the tree. This results in the considerable advantage of leaving the tree trunk completely unstressed and without bending moments of any kind during the cutting phase. It will be appreciated that, if the design had been such that the tree grappling means were in engagement with the tree during the cutting procedure by the circular saw blade, any misalignment between the tree grappling means and the tree itself would place a localized bending moment on the tree trunk, so that as the saw blade were nearing the completion of its cut, it is likely that the tree, both above and below the location of the cut or kerf, would splinter. Any splintering results in an unusable end portion for the cut tree, and reduces the usable production capability of the machine.

The main embodiment disclosed in the said earlier Canadian patent application Ser. No. 383,217 is one in which the felling head is adapted for "straight-ahead" operation, in which the motion of the felling head during the cutting phase is intended to be along a line parallel with the boom.

There are two operations which can accomplish such straight-ahead cutting for a felling head of the kind just mentioned. In the first procedure, the boom is held stationary in front of the vehicle, and the vehicle is driven forwardly to carry the felling head toward a tree in the path of the vehicle. This is a somewhat uncertain maneuver because of the possibility of uneven terrain beneath the vehicle. In the case of uneven terrain, the boom and the felling head can be caused to oscillate or gyrate in such a way that it is difficult to arrive at a clean cut. The second operation is to keep the vehicle stationary and to extend the boom. In the case of a telescoping boom, the felling head would normally be controllable and capable of producing a clean cut. However, in the case of a knuckle boom, in which two boom portions are articulated together with the felling head being articulated to the end of the remote portion, a complex arrangement of hydraulic controls and compensating maneuvers must be used in order to allow the felling head to move forwardly without gradually tilting, i.e. without a shift in the orientation of the plane in which the circular cutting saw is rotating.

GENERAL DESCRIPTION OF THIS INVENTION

Essentially, the present invention seeks to solve the foregoing difficulties by so arranging the felling head on the end of the boom that it is possible to harvest a tree by swinging the boom sideways. Specifically, since it is convenient to keep the circular saw blade largely enclosed in a housing for safety and other reasons, the aim of this invention is attained by arranging to expose a portion of the periphery of the circular cutting saw over an arc which is offset with respect to a line through the cutting saw axis parallel with the boom. Moreover, by using an arc sufficiently large and appropriately located, the felling head will be capable of harvesting a tree whether operating in the straightahead mode, or in the side-swing or scything mode. With these two modes as extremes, it will be appreciated that angles between the straight-ahead mode and the side swathing can also be utilized. A preferred embodiment of this invention meets the latter criteria.

"Accordingly, this invention provides a felling head for attachment to a boom, the felling head comprising an upper part and a lower part. The upper part includes a brace portion adapted to contact a tree being felled, along with tree grappling means adapted to clasp a tree trunk against the brace portion. The lower part has a circular saw blade mounted thereon in a plane perpendicular to the longitudinal extent of a tree clasped between the brace portion and the grappling means. Housing means are provided for the circular saw blade, the housing means being shaped to expose the circular saw blade over an arc thereof which is offset with respect to a line which passes through the saw blade axis and is parallel to the boom, whereby the felling head can cut trees in a scything action with the boom swinging sideways. The felling head includes means for mounting the felling head to the boom for pivotal motion in a vertical plane substantially parallel with the boom, the offset exposed arc of the circular saw blade lying substantially wholly to one side of a hypothetical plane which passes through the rotational axis of the saw blade and is parallel to the boom."

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
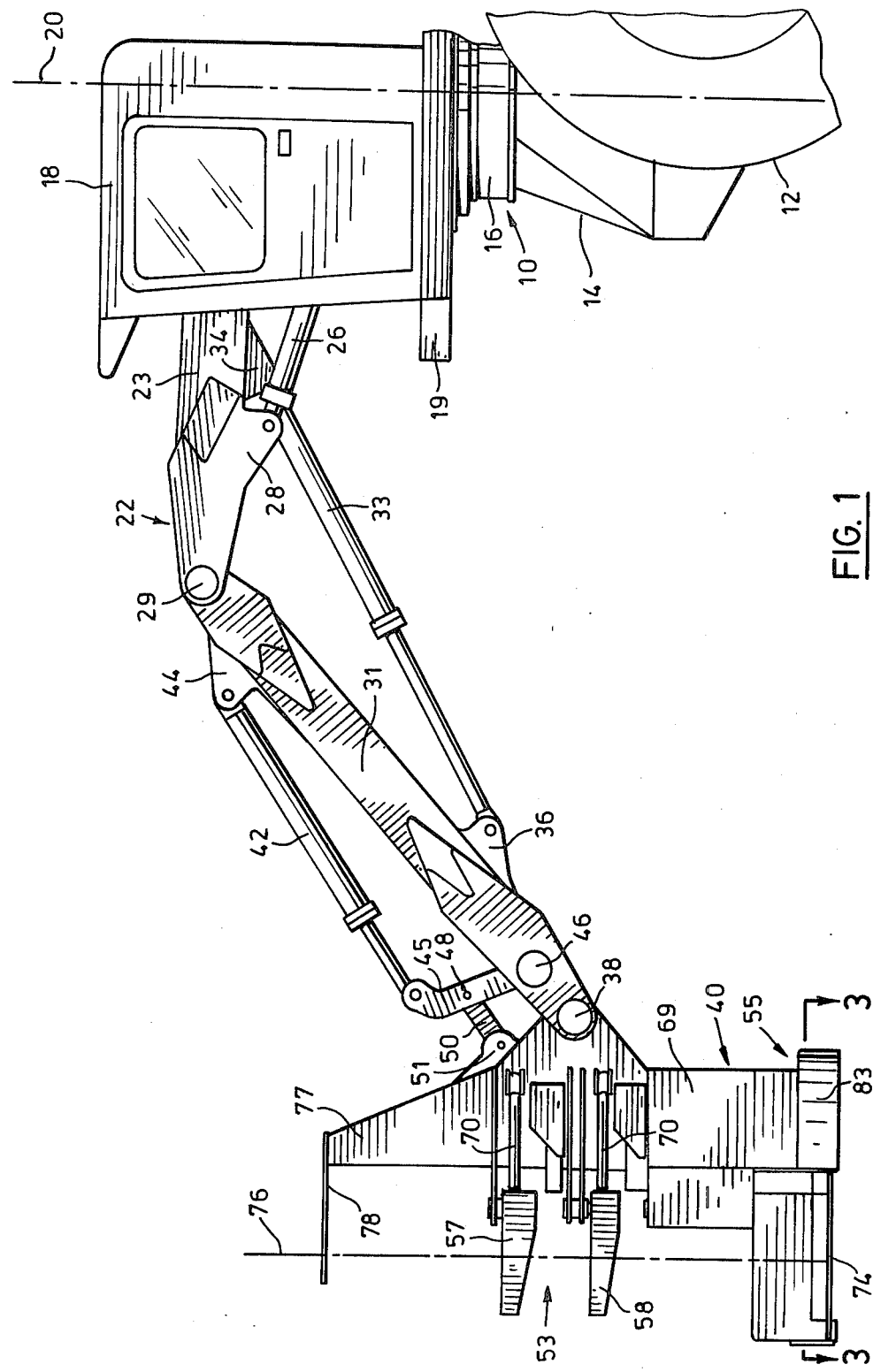
FIG. 1 is a somewhat schematic elevational view of a boom-supported felling head mounted on a vehicle.
Figure 2:
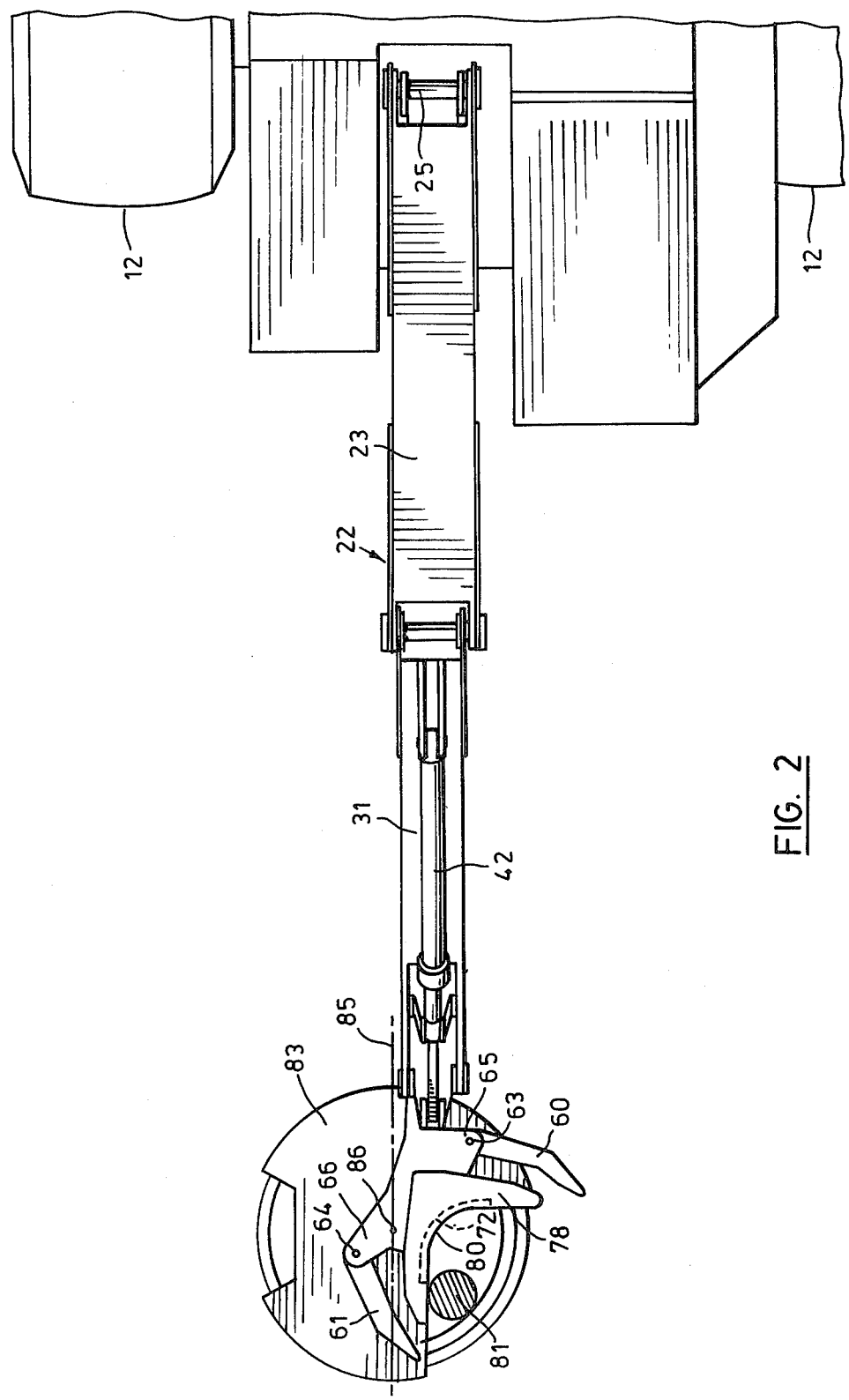
FIG. 2 is a plan view of the apparatus shown in FIG. 1.

Attention is first directed to FIG. 1, which shows a somewhat schematic elevational view of the front portion 10 of a wheeled vehicle of conventional nature, adapted to move through wooded or forested terrain for the purpose of harvesting trees. The vehicle includes wheels 12, a frame structure 14, a turntable 16, a cab 18 and cab base 19 mounted for rotation about the axis 20 of the turntable 16, and a boom generally shown by the numeral 22. The boom includes an inner portion 23 mounted to rotate about a horizontal axis in a vertical plane which is fixed with respect to the cab 18 and thus rotates therewith. The horizontal pivot location for the inner portion 23 is not visible in FIG. 1, but is seen in FIG. 2 at the line 25. A hydraulic cylinder 26 is secured between a bracket 28 on the inner portion 23 of the boom 22, and at a further location fixed with respect to the cab base 19 (not seen in the figures), so that extension and retraction of the hydraulic cylinder 26 will cause the inner portion 23 of the boom 22 to rotate clockwise or counter-clockwise about its pivot line 25, respectively, thus raising and lowering, respectively, a junction axis 29 between the inner portion 23 of the boom 22 and an outer portion 31. The outer portion 31 of the boom 22 is pivotally mounted about a horizontal axis identified by the numeral 29, and thus the outer portion 31 remains always in the same vertical plane with the inner portion 23, swivelling along with the inner portion 23 as the cab base 19 rotates about the axis 20. A further hydraulic cylinder 33 is pivoted between a bracket 34 on the inner portion 23 of the boom 22 and a bracket 36 on the outer portion 31. Extension and contraction of the hydraulic cylinder 33 causes the outer portion 31 to rotate clockwise and counter-clockwise, respectively, about the horizontal pivot 29.

At the distal end of the outer portion 31 is a horizontal pivot axis 38 about which a felling head generally shown by the numeral 40 is pivotally mounted. In order to positively control the attitude of the felling head 40, a third hydraulic cylinder 42 is pivotally mounted between a bracket 44 on the outer portion 31 of the boom 22 and a lever arm 45 which is pivotally mounted about the horizontal axis 46. At a location intermediate of the lever arm 45 is an axis 48 to which a link 50 is connected. The other end of the link 50 is pivotally connected to a bracket 51 on the felling head 40. It will be seen that extension and retraction of the third hydraulic cylinder 42 will cause counter-clockwise and clockwise movement, respectively, of the head 40 about the pivot axis 38, as pictured in FIG. 1.

The felling head 40 includes an upper portion generally shown by the numeral 53, and a lower portion genrally indicated by the numeral 55. The upper portion of the felling head 40 includes two pairs of grappling arms identified by the numerals 57 and 58 respectively for the upper and lower pairs in FIG. 1. The top pair 57 of arms is illustrated in FIG. 2, and is seen to include two individual arms 60 and 61, which are pivotally mounted for swinging motion in a horizontal plane about axes 63 and 64, respectively. The arms 60 and 61 are mounted to brackets 65 and 66, respectively, which extend outwardly from a central column 69 which is pictured in both FIGS. 1 and 3. Hydraulic means are provided for closing and opening the individual pairs 57 and 58 of arms, some of the hydraulic mechanism being shown at the numeral 70 in FIG. 1. Because this particular hydraulic structure plays no part in the present invention, further detailed description thereof is not essential. A description of equivalent hydraulic control for arms of this kind may be found in copending application Ser. No. 383,217 filed on Aug. 5, 1981.

Shown in broken line 72 in FIG. 2 is the outline of a brace portion located between the arms 60 and 61 of the top pair 57, the brace portion 72 being horizontally aligned with the arms, so that the grappling arms are enabled to clasp a tree trunk against the brace portion 72.

The lower part 55 of the felling head 40 includes a circular saw blade 74 mounted in a plane perpendicular to the general longitudinal extent of the tree clasped between the brace portion 72 and the grappling arms 57 and 58. In the actual construction, with the column 69 oriented vertically, the circular saw blade 74 is in a horizontal plane. This attitude is shown in FIG. 1, and it is in this orientation that the felling head 40 would be used to fell a vertical tree whose centre line lay along the broken line 76 in FIG. 1.

The felling arm 40 includes an extension brace portion 77 which projects above the location of the tree grappling arms 57 and 58 as can be seen in FIG. 1, and has mounted thereon a boomerang-shaped flange 78 (see in both FIGS. 1 and 2) which defines a recess 80 adapted to receive a tree being felled, for example the tree shown at 81 in FIG. 2). A similar recess is provided just above the saw blade 74, and for a description thereof attention is directed to FIGS. 2 and 3.

The circular saw blade 74 is located within a housing 83 which covers most of the blade but which is shaped and constructed so as to expose the circular saw blade 74 over an arc A which is offset with respect to a line 85 which passes through the saw blade axis 86 parallel to the boom. The line 85 is drawn as a broken line in both FIGS. 2 and 3. In this disclosure and in the appended claims, the word "offset" does not necessarily imply that the arc is wholly to one side of the line 85, since it is conceivable that the arc A could pass across the line 85. What is deemed important is that the arc A be located sufficiently around the circumference in one direction from the line 85 to allow the felling head to cut trees in a scything action with the boom moving sideways. In FIG. 2, it can be clearly seen that the tree 81 could be cut with the boom 22 simply swinging sideways, without undergoing extension, and without requiring the vehicle 10 to move forwardly.

Figure 3:
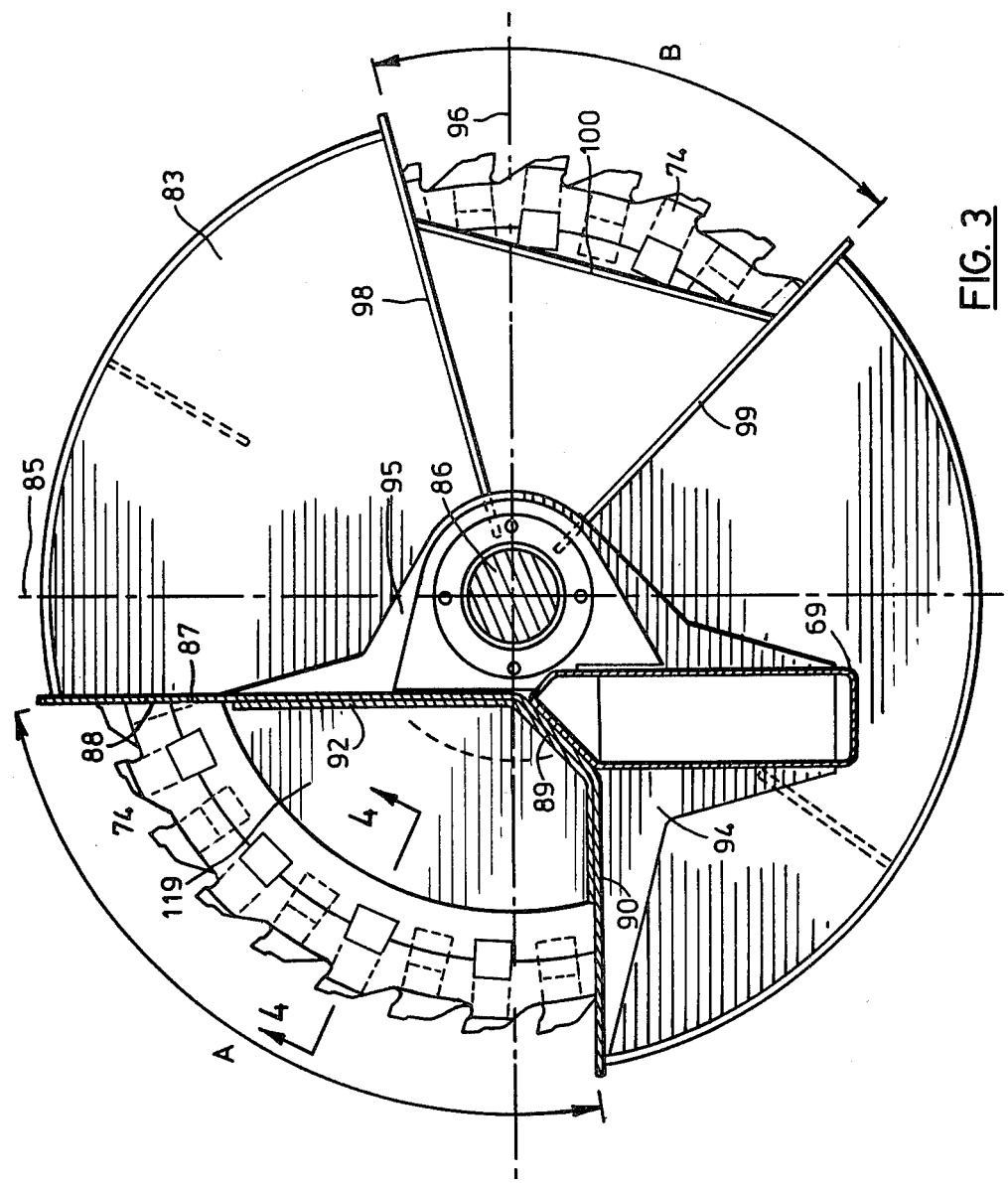
FIG. 3 is a horizontal sectional view taken at the line 3—3 in FIG. 1.

Looking at FIG. 3, it can be seen that the housing 83 is cutaway or recessed by virtue of an upstanding plate 87 which is bent generally in an L-shape so that it includes a first arm 88 extending from the periphery of the housing 83 inwardly to a location about even with the pivot axis 86 of the saw blade 74, but offset leftwardly therefrom. The arm 88 is substantially parallel with the line 85 which extends parallel with the boom. The plate 87 then undergoes a 135° angulation at 89, and then a further 135° angulation to define a second arm 90 extending again to the periphery of the housing 83. The plate 87 is reinforced by an additional plate 92 as seen in FIG. 3, over its inner portion, i.e. the location which will receive the most contact from tree trunks.

As can be seen in FIG. 3, the internal 135° angulation 89 of the plate 87 is welded directly to the column 69, and is braced therefrom by virtue of angulated brace plates 94 and 95 of known construction.

The recess defined by the reinforced bent plate 87 just above the saw blade 74 is in alignment with the recess 80 defined by the boomerang-shaped plate 78 shown in FIG. 2. Hence, a tree trunk can be securely grasped and supported by the pairs 57 and 58 of arms, with two locations or pressure points being applied to the tree at distances spaced in opposite directions from the arms 57 and 58, to steady the same.

It will be noted that, in the particular structure shown in FIG. 3, a line or vertical plane through the rotational axis 86 of the saw blade which is also at right angles to the plane or line represented by the line 85 also passes through the exposed arc A of the saw blade. The location of the further plane just mentioned is shown by the broken line 96 in FIG. 3.

As can be seen in FIG. 3, the housing 83 is shaped to expose a further arc B of the circular saw blade 74 which is offset to the side of the line 85 that is opposite the offset of the first-mentioned exposed arc A. To this end, the housing 83 is cut away as shown in FIG. 3, and two plates 98 and 99 are disposed substantially radially with respect to the pivot axis 86 of the saw blade 74, suitably welded to the outer portion of the housing 83. A cross-wall 100 is provided to span between the walls 98 and 99 and is welded thereto just above the plane of the saw blade 74. In the preferred embodiment shown in FIG. 3, the further arc B is wholly to the righthand side of the line 85 in FIG. 3, just as the arc A is wholly to the left of the line 85. Also as seen in FIG. 3, the line 96, which lies at right angles to the line 85, also passes through the arc B.

The arc A shown in FIG. 3 is approximately although it is considered that arcs of different angles would be useful. In a general way, an exposed arc of between about 90° and about 110° of the blade's periphery would be useful for the arc A.

For the arc B, shown in FIG. 3 as approximately 45° the approximate range would be between about 40° and about 60° of the blade's periphery. These angulations, however, are not considered to be limiting in any sense.

It will be noted in FIG. 2 that the arms 60 and 61 are substantially symmetrically disposed about an imaginary line at 135° with respect to the line 85 which is parallel with the boom 22. This allows trees to be cut when the felling head is being moved in a direction forming an angle of 135° with respect to the boom. Hence, it will be appreciated, particularly by looking at FIG. 2, that trees can be felled when (a) the boom is simply swinging sideways without extension and without vehicle movement, (b) the vehicle is stationary and the boom is merely being extended forwardly so that the felling head moves parallel with the boom with no swinging motion, (c) the boom is held fixed with respect to the vehicle and the vehicle is driven forwardly, and (d) a combination of swinging and forward movement (either of the boom of the vehicle) causes the felling head 40 to move with respect to the terrain at an angle between 90° and 180° with respect to the instantaneous elongation direction of the boom 22.

Figure 4:
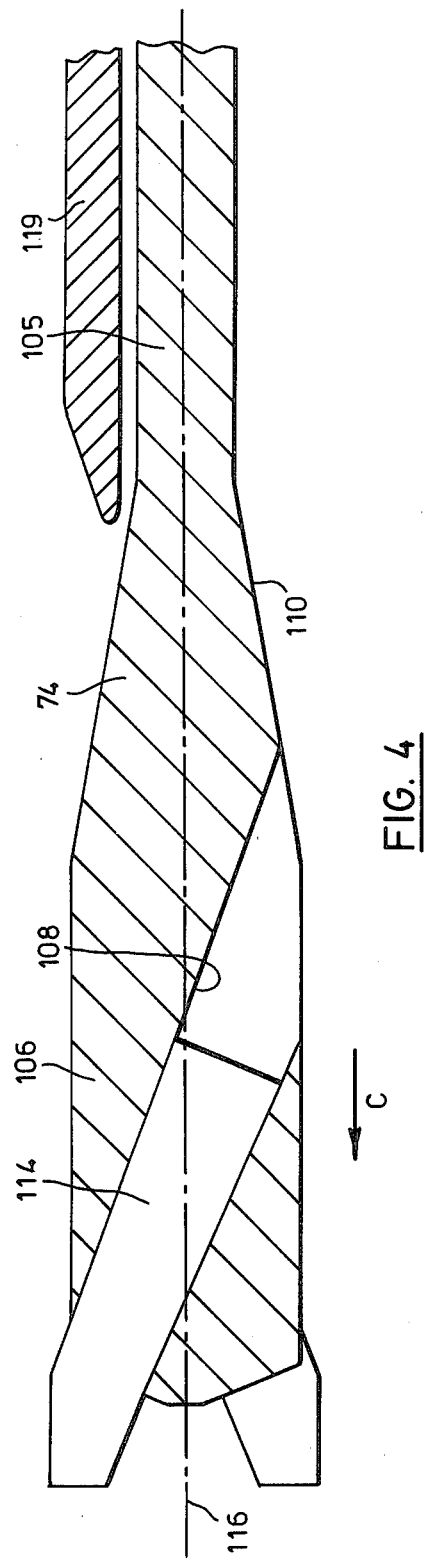
FIG. 4 is a vertical sectional view taken at the line 4—4 in FIG. 3.

Attention is now directed to FIG. 4, which shows a section through the section line 4—4 in FIG. 3.

Essentially, the novel aspect shown in FIG. 4 is that of allowing tapered cutting teeth to fit within correspondingly tapered passageways, so that the centrifugal force exerted on the teeth by the rotation of the saw blade 74 will simply lodge them more securely in their passageways, rather than work to dislodge the teeth.

More specifically, FIG. 4 shows the peripheral portion of the saw blade 74, with the arrow C designating the direction of centrifugal force. As can be seen in FIG. 4, the disc of the saw blade includes a thinner central portion 105, and a thickened peripheral portion 106, through which alternately angulated passageways 108 are provided. More specifically, every other one of the tooth passageways 108 angles upwardly and outwardly from the bottom surface 110 of the portion 106, and the intervening passageways are angled downwardly and outwardly, opening through the top of the portion 106. In FIG. 3, an opening through the top of the portion 106 is designated by the numeral 112. As can be seen in FIG. 4, the individual teeth 114 are tapered in the outward direction, as is the corresponding passageway 108. In the embodiment shown in FIGS. 3 and 4, the passageway 108 also tapers outwardly as seen in plan view, thus there is a double taper for the essentially rectangular cross-section passageway 108. It will be understood that it is not essential to have both tapers present in order to achieve the benefits of this construction.

It will therefore be apparent that the construction shown particularly in FIG. 4 achieves several advantages. Firstly, as already mentioned, the individual teeth 114 simply become more securely lodged with respect to the second portion 106 of the circular saw blade 74, as a result of the centrifugal force acting in the direction of the arrow C. Secondly, however, the relatively simple tooth construction allows the individual teeth to be displaced upwardly and downwardly with respect to the central plane of the disc, which is identified in FIG. 4 by the line 116. This is of importance for the structure under consideration, because it is desirable to make the kerf (saw cut) through the tree trunk as wide as conveniently possible, since this will allow a certain scope for mis-alignment or out-of-horizontality for the felling head 40 as it approaches and cuts through a tree.

As seen in FIGS. 3 and 4, a cover plate 119 is provided directly above but not in contact with the circular saw blade 74. The plate 119 is stationary, and its purpose is to support the weight of a tree after it has been cut through, and during the clasping of the tree by the pairs of arms 57 and 58. If the tree were to fall down against the saw blade 74, not only would its weight seek to bend or distort the saw blade 74, but considerable burning and heat generation would take place.

In the use of the felling head 40 shown in the drawings and described above, it will be appreciated that a tree can be felled during a boom swinging motion, whether or not the boom also imparts a component of motion to the felling head which is parallel with the boom. In the normal performance of the method disclosed here, the pairs of arms 57 and 58 are open wide, and the felling head 40 is brought up against a tree with the saw blade 74 spinning. The saw blade is caused to cut through the tree, and just as the cut terminates, the pairs 57 and 58 of grappling arms are activated to clasp the tree trunk into the V-shaped recess defined above and below the arms 57 and 58 by virtue of the plate 78 and the plate 87. By consructing the arms of the pairs 57 and 58 such that they include an intermediate articulation between two portions but such that the outer portion cannot pivot outwardly beyond a certain location in which it is roughly parallel to the inner portion, it is possible to clasp a first tree with one of the pairs of arms, then clasp a second tree with the second pair of arms such that the second tree lies outside of the first pair of arms, and then to withdraw the first pair of arms from between the two trees so that a third tree can be clasped by them. This particular procedure is mentioned in copending Canadian application Ser. No. 383,219, filed on Aug. 5, 1981, and is also a major feature of issued Canadian Pat. No. 1,065,742 issued on Dec. 6, 1979.

I claim:

1. A felling head for attachment to a boom, the felling head comprising:

an upper part and a lower part, the upper part including a brace portion adapted to contact a tree being felled, along with tree grappling means adapted to clasp a tree trunk against said brace portion, the lower part having a circular saw blade mounted thereon in a plane perpendicular to the longitudinal extent of a tree clasped between the brace portion and the grappling means, and housing means for said circular saw blade, the housing means being shaped to expose the circular saw blade over an arc thereof which is offset with respect to a line which passes through the saw blade axis and is parallel to said boom, whereby the felling head can cut trees in a scything action with the boom swinging sideways, the felling head including means for mounting the felling head to the boom for pivotal motion in a vertical plane substantially parallel with the boom, the said offset exposed arc of the circular saw blade lying substantially wholly to one side of a hypothetical plane which passes through the rotational axis of the saw blade and is parallel to the boom.

2. The felling head claimed in claim 1 which further includes an extension brace portion projecting above the location of the tree grappling means and providing a first recess adapted to receive a tree being felled, the housing providing, above the exposed saw blade arc, a second recess adapted to receive a tree being felled, whereby the tree can be securely held by said tree grappling means.

3. The felling head claimed in claim 1, in which the housing means is shaped to expose a further arc of the circular saw blade which is offset to the side of the said line which is opposite the offset of the first-mentioned exposed arc.

4. The felling head claimed in claim 3, in which said further arc covers between about 40° and about 60° of the blade's periphery.

5. The felling head claimed in claim 1 in which said exposed arc of the saw blade is positioned such that a further hypothetical plane which contains the rotational axis of the saw blade and which is at right angles to the first hypothetical plane through the axis passes through said exposed arc.

6. The felling head claimed in claim 5, in which the housing means is shaped to expose a further arc of the circular saw blade lying wholly to the other side of the said plane parallel to the boom, the said further plane also passing through the further exposed arc, whereby the feller head can be used to cut trees on the backswing.

7. A felling head for attachment to a boom, the felling head comprising:

an upper part and a lower part, the upper part including a brace portion adapted to contact a tree being felled, along with tree grappling means adapted to clasp a tree trunk against said brace portion, the lower part having a circular saw blade mounted thereon in a plane perpendicular to the longitudinal extent of a tree clasped between the brace portion and the grappling means, and a housing enclosing the saw blade except for two exposed portions thereof on either side of a line parallel to the boom and passing through the rotational axis of the saw blade, whereby the felling head can fell trees when the boom swings horizontally without extension in either direction, one of said exposed portions being aligned with said tree grappling means.

8. The felling head claimed in claim 7, in which said one of said exposed portions is large enough to allow the head to cut and collect trees when the felling head is being moved in a direction forming an angle of 135° with respect to the boom, the grappling arms being substantially symmetrically disposed about a line at 135° with respect to the boom.

* * * * *